United States Patent
Rozman et al.

(10) Patent No.: US 8,829,826 B2
(45) Date of Patent: Sep. 9, 2014

(54) REGENERATIVE LOAD ELECTRIC POWER MANAGEMENT SYSTEMS AND METHODS

(75) Inventors: Gregory I. Rozman, Rockford, IL (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 424 days.

(21) Appl. No.: 13/218,156

(22) Filed: Aug. 25, 2011

(65) Prior Publication Data

US 2013/0049657 A1  Feb. 28, 2013

(51) Int. Cl.
| | |
|---|---|
| H02P 3/14 | (2006.01) |
| B60L 7/14 | (2006.01) |
| B60L 11/18 | (2006.01) |
| B60L 7/22 | (2006.01) |
| B60L 7/06 | (2006.01) |
| B60W 30/18 | (2012.01) |
| B60W 10/08 | (2006.01) |
| H02M 7/797 | (2006.01) |

(52) U.S. Cl.
CPC ............ B60W 30/18127 (2013.01); B60L 7/14 (2013.01); B60L 11/1803 (2013.01); B60L 7/22 (2013.01); Y02T 10/7233 (2013.01); Y02T 10/70 (2013.01); B60L 7/06 (2013.01); B60L 2210/12 (2013.01); Y02T 10/7225 (2013.01); H02M 7/797 (2013.01); B60L 2210/14 (2013.01); Y02T 10/7005 (2013.01); B60W 10/08 (2013.01)
USPC ........... 318/376; 318/800; 318/801; 323/259; 323/344; 363/40; 363/55

(58) Field of Classification Search
CPC ................. H02P 27/08; H02P 27/06
USPC ......... 318/721, 800, 813, 821, 799, 599, 432, 318/811, 801, 374, 375, 376; 363/40, 55, 363/95, 120, 174, 175, 176, 177; 323/259, 323/344

See application file for complete search history.

(56) References Cited

U.S. PATENT DOCUMENTS

| | | | |
|---|---|---|---|
| 4,093,900 | A | 6/1978 | Plunkett |
| 4,119,861 | A | 10/1978 | Gocho |
| 4,420,784 | A | 12/1983 | Chen et al. |

(Continued)

FOREIGN PATENT DOCUMENTS

| | | |
|---|---|---|
| DE | 19607669 A1 | 9/1997 |
| EP | 1921531 A1 | 5/2008 |
| EP | 2179882 | 4/2010 |

OTHER PUBLICATIONS

European International Search Report dated Dec. 20, 2012 for Application No. 12181229.1-1233.

(Continued)

*Primary Examiner* — Antony M Paul
(74) *Attorney, Agent, or Firm* — Cantor Colburn LLP

(57) ABSTRACT

A regenerative load electric power management system can include a system bus, an input filter coupled to the system bus, a first bidirectional solid state power controller coupled to the system bus, a motor drive inverter coupled to the input filter, a second bidirectional solid state power controller coupled to the motor drive inverter, a bidirectional direct current DC-DC converter coupled to the second bidirectional solid state power controller and an energy storage bus coupled to the bidirectional DC-DC converter, the energy storage bus providing access to an energy storage device.

20 Claims, 3 Drawing Sheets

(56) References Cited

U.S. PATENT DOCUMENTS

| | | | |
|---|---|---|---|
| 4,638,175 | A | 1/1987 | Bradford et al. |
| 5,132,894 | A | 7/1992 | Rozman et al. |
| 5,291,143 | A | 3/1994 | Cronauer |
| 5,350,997 | A | 9/1994 | Ghotbi et al. |
| 5,422,517 | A | 6/1995 | Verney et al. |
| 5,455,731 | A | 10/1995 | Parkinson |
| 5,466,998 | A | 11/1995 | Kinoshita et al. |
| 5,495,155 | A | 2/1996 | Juzswik et al. |
| 5,526,347 | A | 6/1996 | Chen et al. |
| 5,710,699 | A * | 1/1998 | King et al. ............... 363/132 |
| 5,752,047 | A | 5/1998 | Darty et al. |
| 6,072,673 | A | 6/2000 | Chen et al. |
| 6,154,379 | A | 11/2000 | Okita |
| 6,577,138 | B2 | 6/2003 | Zuercher et al. |
| 6,643,112 | B1 | 11/2003 | Carton et al. |
| 7,036,028 | B2 | 4/2006 | Zalesski |
| 7,315,774 | B2 | 1/2008 | Morris |
| 7,453,680 | B2 | 11/2008 | Hallak et al. |
| 7,564,147 | B2 | 7/2009 | Michalko |
| 7,595,613 | B2 | 9/2009 | Thompson et al. |
| 7,715,958 | B2 | 5/2010 | Kumar |
| 7,732,939 | B2 | 6/2010 | Fuller et al. |
| 7,741,883 | B2 | 6/2010 | Fuller et al. |
| 7,830,071 | B2 | 11/2010 | Abramovich et al. |
| 7,847,429 | B2 | 12/2010 | Miyama et al. |
| 7,932,633 | B2 * | 4/2011 | King et al. ............... 307/45 |
| 7,952,225 | B2 | 5/2011 | Reichard et al. |
| 8,080,973 | B2 * | 12/2011 | King et al. ............... 320/104 |
| 8,536,730 | B2 | 9/2013 | Rozman et al. |
| 8,553,373 | B2 | 10/2013 | Rozman et al. |
| 2002/0157881 | A1 | 10/2002 | Bakholdin et al. |
| 2003/0102845 | A1 | 6/2003 | Aker et al. |
| 2004/0156154 | A1 | 8/2004 | Lazarovich et al. |
| 2004/0238243 | A1 | 12/2004 | King et al. |
| 2006/0103358 | A1 | 5/2006 | Schulte et al. |
| 2007/0029986 | A1 | 2/2007 | Nakamura et al. |
| 2008/0106152 | A1 | 5/2008 | Maier |
| 2008/0143462 | A1 | 6/2008 | Belisle et al. |
| 2009/0295341 | A1 | 12/2009 | Nakamura et al. |
| 2009/0314179 | A1 | 12/2009 | Kumar |
| 2010/0254046 | A1 | 10/2010 | Liu et al. |
| 2011/0100735 | A1 | 5/2011 | Flett |
| 2012/0112702 | A1 * | 5/2012 | Steigerwald et al. ......... 320/137 |
| 2013/0049465 | A1 | 2/2013 | Rozman et al. |
| 2013/0049648 | A1 | 2/2013 | Rozman et al. |

OTHER PUBLICATIONS

European Search Report dated May 10, 2013 for Application No. 12181417.2-1503.

European Search Report dated May 10, 2013 for Application No. 12181283.8-1503.

* cited by examiner

REGENERATIVE LOAD ELECTRIC POWER MANAGEMENT SYSTEMS AND METHODS

BACKGROUND OF THE INVENTION

The subject matter disclosed herein relates to electric power generation and distribution, and more particularly to regenerative load electric power management.

Electrical power systems in hybrid vehicles, such as military hybrid vehicles, can include high voltage direct current (DC) power generation and distribution systems, and multiple actuation loads. Regenerative power from the actuation loads may be returned to the distribution (system) bus. Conventional methods implement shunt regulators to dissipate regenerative power into a power dissipation resistor. These methods require additional thermal management to manage heat generated in the dissipation resistor. In one approach, the regenerative power is redirected to a power sink, such as into ancillary electrical loads or to the starter/generator as mechanical (kinetic) energy. However, current methods do not adequately harvest regenerative energy and can result in a reduction in the power quality on the DC bus during load transients.

BRIEF DESCRIPTION OF THE INVENTION

Exemplary embodiments include a regenerative load electric power management system, including a system bus, an input filter coupled to the system bus, a first bidirectional solid state power controller coupled to the system bus, a motor drive inverter coupled to the input filter, a second bidirectional solid state power controller coupled to the motor drive inverter, a bidirectional DC-DC converter coupled to the second bidirectional solid state power controller and an energy storage bus coupled to the bidirectional DC-DC converter, the energy storage bus providing access to an energy storage device.

Additional exemplary embodiments include a regenerative load electric power management system, including a system bus, a first solid state power controller coupled to the system bus, a local bus coupled to the first solid state power controller, a second solid state power controller coupled to the local bus, a bidirectional DC-DC converter coupled to the second solid state power controller, and an energy storage bus coupled to the bidirectional DC-DC converter, the energy storage bus providing access to an energy storage device.

Further exemplary embodiments include a power flow method in a regenerative load electric power management system having a system bus, a energy storage bus, a local bus coupled to and between the system bus and the energy storage bus and a regenerative load coupled to the local bus. The method includes receiving power on the local bus from the system bus, receiving additional power on the local bus from the energy storage bus, receiving regenerative energy on the local bus from the regenerative load and determining if the regenerative energy can be stored on the energy storage bus.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Exemplary embodiments include systems and methods for harvesting regenerative energy and improving power quality on a DC bus during load transients. The systems include an additional energy storage power bus, a set of solid state power controllers (SSPC) with bidirectional power interruption topology and bidirectional DC-DC converters to achieve improved system operation while keeping system weight, size and cost low.

Figure 1:
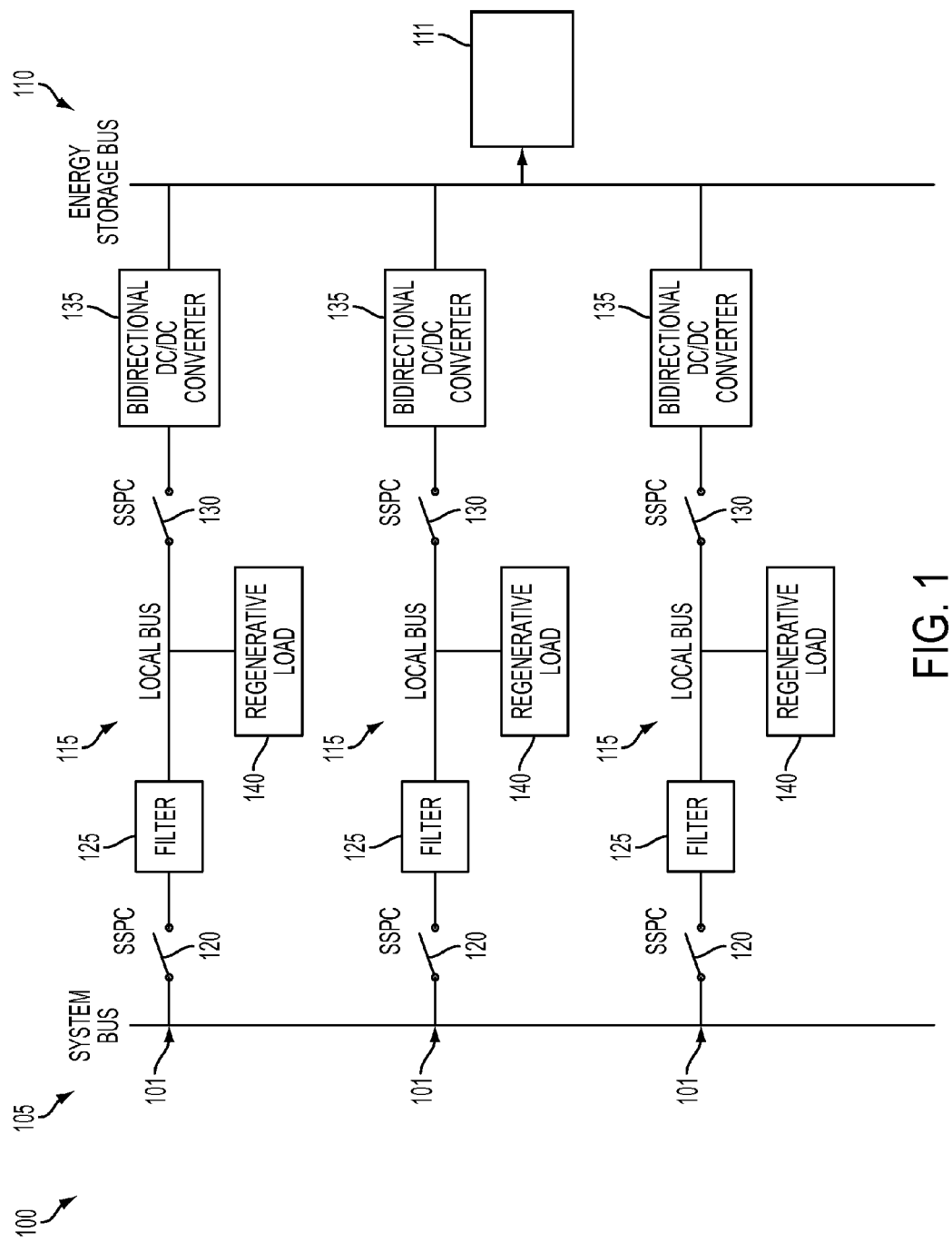
FIG. 1 illustrates a regenerative load electric power management system.

FIG. 1 illustrates a regenerative load electric power management system 100. The system includes a system bus 105 and an energy storage bus 110 having several channels 101 there between. The illustrated system 100 includes an energy storage device 111 coupled to the energy storage bus 110. The system 100 further includes multiple local buses 115 coupled between the system bus 105 and the energy storage bus 110. It can be appreciated that the system 100 can include fewer or more channels 101 and local buses 115. The three illustrated channels 101 including respective local buses 115, components and loads are discussed in conjunction herewith. The system 100 further includes a first solid state power controller (SSPC) 120 coupled to the system bus 105. SSPCs are implemented in power distribution systems to replace traditional electromechanical circuit breakers.

Each channel 101 further includes an input filter 125 coupled to the first SSPC 120. Each channel 101 also includes a second SSPC 130 coupled to the input filter 125. Each local bus 115 further includes a bidirectional DC-DC converter 135 coupled to and between the second SSPC 130 and the energy storage bus 110. Each local bus 115 is coupled to and between the input filter 125 and the second SSPC 130 of a respective channel 101. The system 100 further includes a regenerative load 140 coupled to the local bus 115. Energy storage device 111 is coupled to the energy storage bus 110, where the energy storage bus 110 provides access between the bidirectional DC-DC converter 135 and the energy storage device 111.

Figure 2:
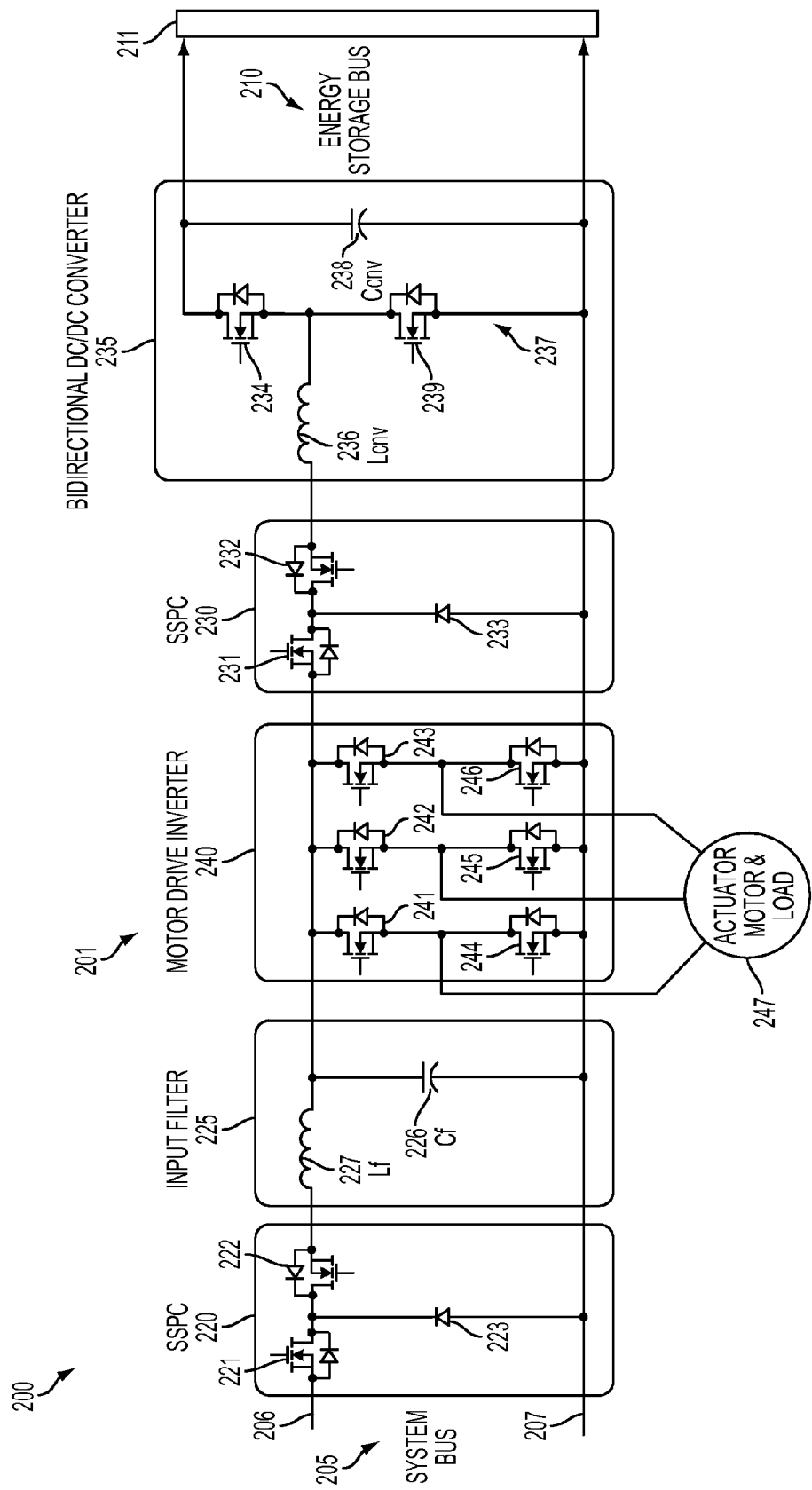
FIG. 2 illustrates a regenerative load single channel electric power management system.

FIG. 2 illustrates a single-channel regenerative load electric power management system 200. FIG. 2 is similar to FIG. 1 illustrating further details of a particular one of the multiple channels 101 shown therein. The system 200 includes single channel 201 coupled between a system bus 205 and an energy storage bus 210. The system bus 205 is a high voltage DC bus (e.g., 600V DC for hybrid military ground vehicles). The channel 201 can further include a positive rail 206 and a negative rail 207 disposed between the system bus 205 and the energy storage bus 210. The channel 201 includes a first SSPC 220 that is coupled between the system bus 205 and an input filter 225 that is coupled to the first SSPC 220. The channel 201 further includes a motor drive inverter 240 coupled to the input filter 225. The channel 201 also includes a second SSPC 230 coupled to the motor drive inverter 240. The channel 201 further includes a bidirectional DC-DC converter 235 that is coupled to and between the second SSPC 230 and the energy storage bus 210. The first SSPC 220, the input filter 225, the motor drive inverter 240, the second SSPC 230 and the bidirectional DC-DC converter 235 are all coupled to a local bus that resides between the system bus 205 and the energy storage bus 210 and can provide power to and remove power from a load such as actuator motor 247.

In one embodiment, the first and second SSPC 220, 230 each include back-to-back connected metal on oxide field effect transistors (MOSFET) 221, 222, 231, 232 to achieve bidirectional current interruption in the SSPCs 220, 230. As such, the SSPCs 220, 230 are bidirectional SSPCs. The MOSFETS 221, 222 provide bidirectional current interruption between the system bus 205 and the input filter 225, and the MOSFETS 231, 232 provide bidirectional current interruption between the motor drive inverter 240 and the bidirectional DC-DC converter 235. The first and second SSPC 220, 230 each further include an overvoltage protection diode 223, 233 connected at a center point of the SSCPs 220, 230 and bridging the positive rail 206 and the negative rail 207. The overvoltage protection diodes 223, 233 prevent an overvoltage condition during turn-off.

In one embodiment, the input filter 225 can be an LC filter having a capacitor 226 coupled between the first rail 206 and the second rail 207 and an inductor 227 coupled to the capacitor 226. The capacitor 226 and the inductor 227 have values selected to filter out certain frequencies in the system such as but not limited to harmonics in the current that result from pulse width modulation (PWM) in the motor drive inverter 240.

In one embodiment, the motor drive inverter 240 includes six MOSFETs 241, 242, 243, 244, 245, 246, coupled to one another, and between the first rail 206 and the second rail 207. The MOSFETs 241, 242, 243, 244, 245, 246 are in a three-phase arrangement to power a three-phase actuator motor 247. During actuator acceleration (i.e., an acceleration mode) the motor drive inverter 240 receives power from the system bus 205 and the energy storage bus 210. During actuator deceleration (i.e., a deceleration mode) regenerative power is directed to the system bus 205 or the energy storage bus 210.

In one embodiment, the bidirectional DC/DC converter 235 includes an inductor 236, a phase leg 237 coupled to the inductor 236, and a capacitor 238 coupled in parallel to the phase leg 237. The phase leg 237 includes a first MOSFET switch 234 and a second MOSFET switch 239.

The bidirectional DC/DC converter 235 provides regenerative power transfer from a regenerative load (e.g., the actuator motor 247) to an energy storage device 211 via energy storage bus 210 during actuator deceleration, and enables power transfer from the energy storage bus 210 to the actuator during acceleration. For example, during energy storage mode, the bidirectional DC/DC converter 235 operates as a boost converter by controlling duty cycle of the second MOSFET switch 239, while the first MOSFET switch 234 is open. During power transfer from the energy storage bus 210 to the motor drive inverter 240, the bidirectional DC/DC converter 235 operates as a buck converter by controlling the duty cycle of the first MOSFET switch 234, while the second MOSFET switch 239 is open.

Figure 3:
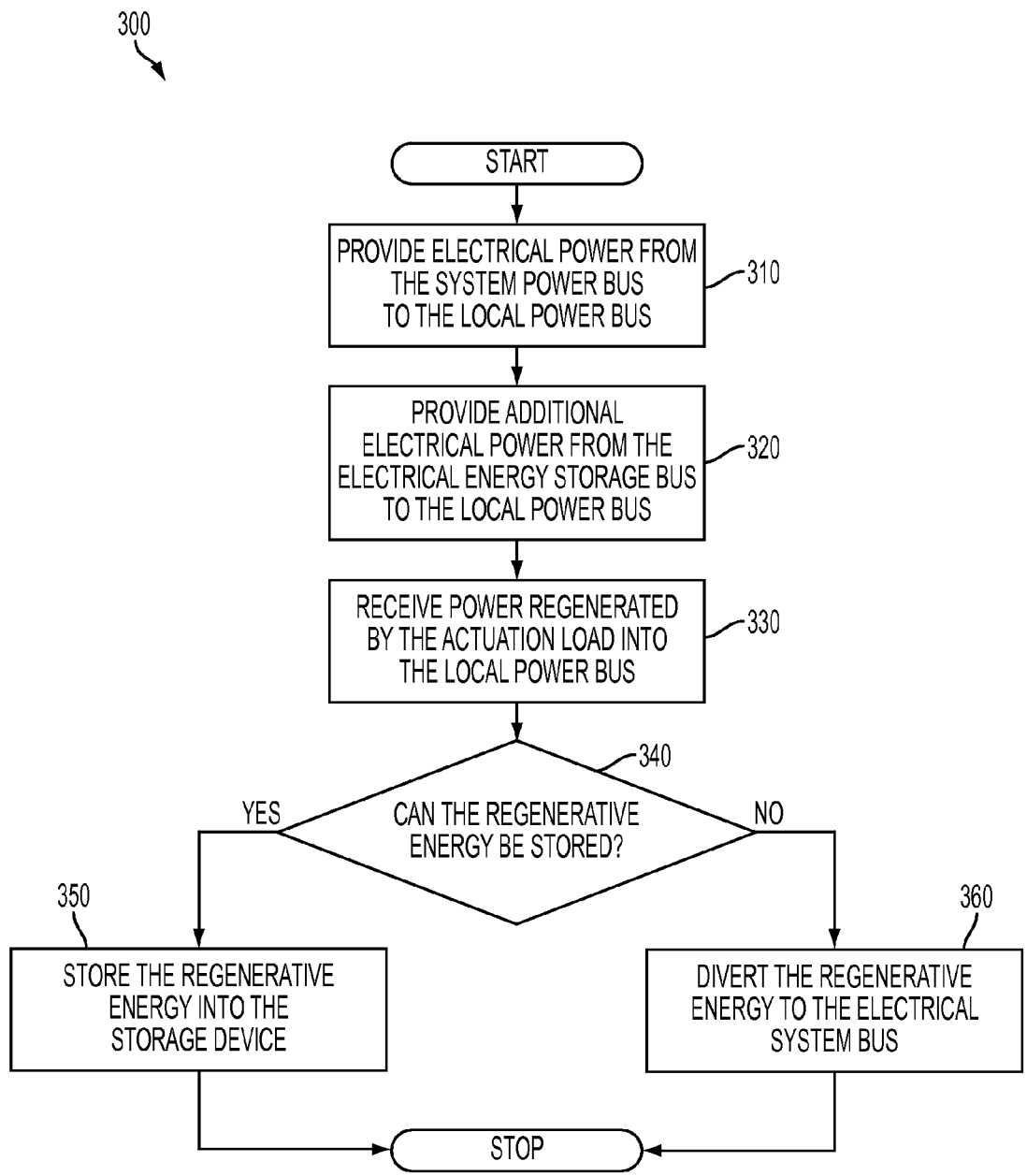
FIG. 3 illustrates a flowchart for a power flow method in a regenerative load electric power management system.

FIG. 3 illustrates a flowchart for a power flow method 300 in a regenerative load electric power management system. At block 310, the system bus (e.g., the system bus 105 in FIG. 1 or the system bus 205 in FIG. 2) provides electrical power to the local power bus (e.g., the local bus 115 in FIG. 1 or via the positive rail 206 and negative rail 207 in FIG. 2). At block 320, the energy storage bus (e.g., the energy storage bus 110 in FIG. 1 or the energy storage bus 210 in FIG. 2) provides additional electrical power to the local power bus to minimize voltage droop during actuator acceleration. At block 330, the local power bus receives energy regenerated by the actuation load (e.g., the regenerative load 140 in FIG. 1 or the actuator motor 247 in FIG. 2). At block 340, it is determined if the regenerative energy can be stored in energy storage device 111, 211 (see FIGS. 1-2). If so, then the regenerative energy is stored in the energy storage device 111, 211 (see FIGS. 1-2) at block 350. If the regenerative energy cannot be stored, then the regenerative energy is diverted to the electrical system bus (e.g., the system bus 105 in FIG. 1 or the system bus 205 in FIG. 2) as indicated at block 360. It can be appreciated that the method 300 cycles constantly when the systems 100, 200 are in operation.

Technical effects include the ability to capture regenerative energy, thereby improving power quality of the system bus in a high voltage DC system. The systems and methods provided herein further provide fault tolerant operation if one of the electric power buses is not available.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A regenerative load electric power management system, comprising:
    a system bus;
    a first bidirectional solid state power controller (SSPC) coupled to the system bus, the first bidirectional SSPC configured to bidirectionally interrupt current;
    an input filter coupled to the first bidirectional SSPC opposite the system bus;
    a motor drive inverter coupled to the input filter opposite the first bidirectional SSPC;
    a second bidirectional SSPC coupled to the motor drive inverter opposite the motor drive inverter the second bidirectional SSPC configured to bidirectionally interrupt current;
    a bidirectional direct current to direct current (DC-DC) converter coupled to the second bidirectional SSPC opposite the motor drive inverter; and
    an energy storage bus coupled to the bidirectional DC-DC converter opposite the bidirectional DC-DC converter.

2. The system as claimed in claim 1 further comprising an actuator motor coupled to the motor drive inverter.

3. The system as claimed in claim 2 wherein the actuator motor has at least an acceleration mode and a deceleration mode.

4. The system as claimed in claim 3 wherein the motor drive inverter is configured to receive power from the system bus and the energy storage bus during the acceleration mode.

5. The system as claimed in claim 3 wherein at least one of the energy storage bus and the system bus are configured to receive regenerative energy from the actuator during the deceleration mode.

6. The system as claimed in claim 1 wherein the input filter is configured to attenuate harmonics from pulse width modulation (PWM) of the motor drive inverter.

7. The system as claimed in claim 1 further comprising a storage device coupled to the energy storage bus.

8. The system as claimed in claim 7 wherein the storage device is configured to receive regenerative energy from the actuator motor.

9. A regenerative load electric power management system, comprising:

a system bus;

a first solid state power controller (SSPC) coupled to the system bus, the first SSPC configured to bidirectionally interrupt current;

a local bus coupled to the first SSPC, the local bus having a positive rail and a negative rail;

a second SSPC coupled to the local bus opposite the first SSPC, the second SSPC configured to bidirectionally interrupt current;

a bidirectional direct current (DC)-DC converter coupled to the second SSPC opposite the first SSPC, the bidirectional DC-DC converter including a first and second metal on oxide field effect transistor (MOSFET), wherein the bidirectional DC-DC converter is configured to operate as a boost converter during an energy storage mode by controlling duty cycle of the second MOSFET while the first MOSFET is open and as a buck converter during a power transfer mode by controlling the duty cycle of the first MOSFET while the second MOSFET is open; and an energy storage bus coupled to the bidirectional DC-DC converter opposite the second SSPC;

wherein the first MOSFET is coupled between the positive rail and the energy storage bus, and the second MOSFET is coupled between the positive rail and the negative rail.

10. The system as claimed in claim 9 further comprising a regenerative load coupled to the local bus via a motor drive inverter.

11. The system as claimed in claim 10 wherein the energy storage bus is configured to provide electrical power to the local bus to decrease voltage droop on the local bus due to acceleration of the regenerative load.

12. The system as claimed in claim 10 wherein the regenerative load is configured to provide regenerated power to the local bus.

13. The system as claimed in claim 10 wherein regenerative energy from the regenerative load is diverted to at least one of an energy storage device coupled to the energy storage bus.

14. The system as claimed in claim 10 further comprising an input filter coupled to and between the first SSPC and the local bus.

15. The system as claimed in claim 14 wherein the input filter is configured to attenuate harmonics from pulse width modulation (PWM) of the regenerative load.

16. The system as claimed in claim 10 further comprising a storage device coupled to the energy storage bus.

17. The system as claimed in claim 16 wherein the storage device is configured to receive regenerative energy from the regenerative load.

18. The system as claimed in claim 9 wherein the system bus is configured to provide electrical power to the local bus.

19. A power flow method in a regenerative load electric power management system having a system bus, an energy storage bus, a local bus coupled to and between the system bus and the energy storage bus and a regenerative load coupled to the local bus, the method comprising:

receiving power on the local bus from the system bus;

receiving additional power on the local bus from the energy storage bus via a bidirectional direct current to direct current (DC-DC) converter, the DC-DC converter having a first and second metal on oxide field effect transistor (MOSFET);

operating the DC-DC converter as a buck converter when additional power is received on the local bus from the energy storage bus by controlling a duty cycle of the first MOSFET while the second MOSFET is open;

receiving regenerative energy on the local bus from the regenerative load;

operating the DC-DC converter as a boost converter when regenerative energy is received on the local bus from the regeneration load by controlling a duty cycle of the second MOSFET while the first MOSFET is open; and determining if the regenerative energy can be stored on the energy storage bus.

20. The method as claimed in claim 19 further comprising:

diverting the regenerative energy to the energy storage bus in the event that the energy can be stored in the energy storage bus or to the system bus in the event that the energy can be stored in the energy storage bus.

\* \* \* \* \*